United States Patent
Kumar et al.

(10) Patent No.: US 12,299,317 B2
(45) Date of Patent: May 13, 2025

(54) WRITE ORDER CONSISTENCY FOR ASYNCHRONOUS HARDWARE WRITES AMONG DISTRIBUTED FORWARDING AND HARDWARE AGENTS WITH VERSIONED CHANGE LOG

(71) Applicant: Arista Networks, Inc., Santa Clara, CA (US)

(72) Inventors: Ashwini Kumar, San Jose, CA (US); Ramakrishna Paduvalli, Saratoga, CA (US); Ramya Edara, Cupertino, CA (US); Sriram Sellappa, San Jose, CA (US); Suhas Joshi, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 32 days.

(21) Appl. No.: 18/301,394

(22) Filed: Apr. 17, 2023

(65) Prior Publication Data
US 2024/0345763 A1 Oct. 17, 2024

(51) Int. Cl.
*G06F 3/06* (2006.01)
(52) U.S. Cl.
CPC .......... *G06F 3/0655* (2013.01); *G06F 3/0604* (2013.01); *G06F 3/067* (2013.01)
(58) Field of Classification Search
CPC .. G06F 13/16; G06F 13/4282; G06F 16/3329; G06F 16/3344; G06F 16/90332; G06F 40/186; G06F 40/284; G06F 40/295; G06F 40/35
See application file for complete search history.

(56) References Cited

U.S. PATENT DOCUMENTS

| | | | |
|---|---|---|---|
| 7,817,549 B1 | 10/2010 | Kasralikar | |
| 9,935,885 B1 | 4/2018 | Shen | |
| 2012/0163389 A1 | 6/2012 | Zhang | |
| 2017/0134277 A1 | 5/2017 | Bifulco | |
| 2020/0042536 A1* | 2/2020 | Kaushik | G06F 11/2097 |
| 2022/0239582 A1 | 7/2022 | Maric | |

OTHER PUBLICATIONS

Office Action issued for U.S. Appl. No. 18/326,821, mailed Dec. 31, 2024, 13 pages.

\* cited by examiner

*Primary Examiner* — Yong J Choe
(74) *Attorney, Agent, or Firm* — Sprinkle IP Law Group

(57) ABSTRACT

Systems and methods for maintaining order consistency for asynchronous writes in a network device. In one embodiment, a method includes issuing, by a feature agent of a network device, a plurality of writes to software tables which may be contained in the feature agent. For each write, a corresponding entry is added to a log associated with the software tables, the log entry identifying an order of the write among the plurality of writes. A hardware agent accesses the log to select a next one of the entries in the identified write order and then accesses the software table to retrieve content identified by the selected log entry. The hardware agent then translates the information from the software table to a different form if necessary and writes the information to one or more hardware tables that are indicated by the write associated with the selected log entry.

20 Claims, 6 Drawing Sheets

WRITE ORDER CONSISTENCY FOR ASYNCHRONOUS HARDWARE WRITES AMONG DISTRIBUTED FORWARDING AND HARDWARE AGENTS WITH VERSIONED CHANGE LOG

BACKGROUND

Features in network devices are implemented by feature agents. Feature agents are processes that run on the operating systems of the network devices. The features may concern, for example, security policies, packet routing, packet tunneling, etc. Many of these feature agents implement the corresponding features by managing corresponding hardware tables in the forwarding chip (which may also be referred to as the ASIC, or application specific integrated circuit) of the network device.

Over time, new features are introduced, so the number of features that are provided on network devices continues to increase. Commonly, these features are provided in response to customer requests. Each of the features is typically implemented using a different feature agent, so the number of feature agents that are executing on a given network device continues to increase. With the increased number of feature agents that are executing in a given network device, the feature agents may not work properly and their operation may become inefficient.

In addition to the inefficiency resulting from the large number of feature agents that are operating in the network device, there are problems resulting from the fact that there are a number of different chipsets provided by a number of different vendors, and it is necessary to ensure that the different feature agents are supported on each of the different chipsets. Because this can be difficult, the feature agents may not work properly.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
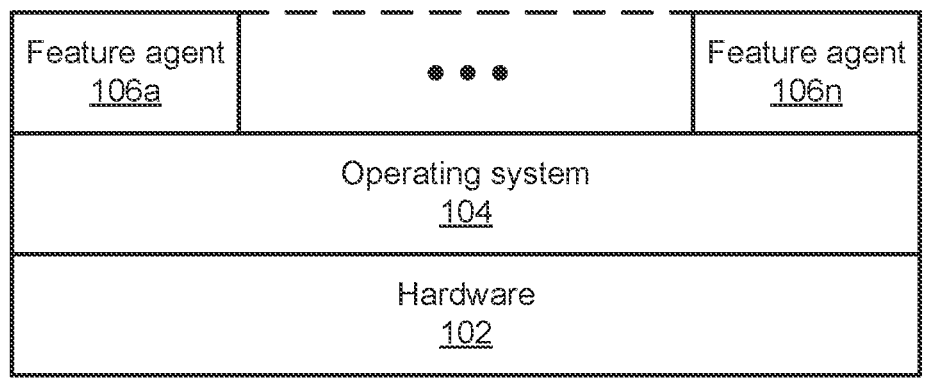
FIG. 1 is a diagram illustrating the high level architecture of a system in accordance with some embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

As noted above, various factors are causing the operation of feature agents to become less efficient, and in some cases causing the feature agents to not work properly. Scale requirements are increasing, sometimes by orders of magnitude, and more networking features are being requested by customers. Additionally, the number of platforms having chipsets from different vendors is increasing, and the feature agents need to be supported in each of these chipsets. Still further, the tasks of the feature agents are in some cases becoming repetitive and prone to problems.

A number of feature agents are concerned with programming the tables in the forwarding chip of the network device. One of the specific problems that makes these feature agents inefficient is that some of them require entries to be written in the hardware tables in a particular order. This may be necessary, for instance, to ensure proper routing of packets based on the entries written in specific hardware tables. In existing systems, the required write ordering is achieved by having the feature agent write the first one of the ordered entries in the hardware table, wait for an acknowledgement that the entry was properly programmed into the table, and then proceed to write the next entry to the table. This may incur a significant delay while waiting for the acknowledgement. Because the feature agent has to wait for an acknowledgement of each write before moving to the next write, making ordered writes to the hardware table slow and inefficient.

In embodiments disclosed herein, rather than having a feature agent write directly to the hardware tables in a sequential fashion with explicit acknowledgement, the feature agent issues ordered writes to corresponding software tables in a non-blocking fashion and makes entries in a versioned log identifying the order of the writes. A hardware writer agent examines the log to determine which of the entries should be written next, retrieves the information corresponding to the log entry from the identified software table and writes the retrieved information into the corresponding hardware table. The hardware agent can then provide cumulative acknowledgements of the writes to the hardware table. It should be noted that "hardware agent" as used herein may also include another process such as a feature agent, firmware in an offload engine, logic in the hardware itself, or the like.

Since the feature agent does not have to wait for acknowledgement of each ordered write into a hardware table before proceeding with the next ordered write, the feature agent can issue the writes (to the software table) more quickly and efficiently than existing systems. Because each entry written in the software tables has a corresponding versioned entry in the log that identifies the order in which it was written to the software table by the feature agent, the hardware agent can maintain the order of the writes as the information from the software table is transferred to the corresponding hardware table. The hardware agent can also perform any reformatting or translation of the information that must be performed by the feature agent in existing systems. The disclosed embodiments thereby remove this burden of reformatting and translating from the feature agent. Additionally, the ability of the hardware agent to provide acknowledgements cumulatively reduces the associated overhead in comparison with the individual acknowledgements provided in existing systems.

Referring to FIG. 1, a diagram illustrating the high level architecture of a system in accordance with one embodiment is shown. As depicted in this figure, an operating system 104 runs on the hardware 102 of a network device. A set of feature agents 106 run on top of operating system 104. Feature agents 106 are software applications that implement a number of advanced networking features at high scale and performance on the network device.

It should be noted that different instances of the same or similar devices may be identified herein by a common reference number followed by a letter. For instance, as depicted in FIG. 1, there is a set of feature agents identified by reference numbers 106a-106n. The individual feature agents may be referred to collectively by the reference number 106 alone. References to individual feature agents 106 will include the letter as well as the number (e.g., feature agent 106a or feature agent 106n). The same is true for the other figures in the application as well.

Over time, new features that were added to the system have been broken up into subparts, and the different subparts have been added into multiple, existing feature agents. Thus, the business logic for a single feature could be spread out over multiple feature agents. This results in bloated feature agents which are inefficient, difficult to maintain, and prone to breaking.

Even if new feature agents are created, the process of creating them is not trivial and may not be straightforward. This process involves building scaffolding for the feature agent as well as feature-specific code that is required to implement a particular feature. Additionally, there are race conditions that are inherent in dealing with other state changes in the system, such as interface/port events, and it is very easy to introduce bugs into the code of the feature agent which can be difficult and time consuming to resolve.

There are also difficulties in writing and testing isolated modules and conditional logic in feature agents, as many of the feature agent unit tests tend to instantiate the full agent, which leads to bloated unit tests that are slow, and constantly consume maintenance cycles. Further, supporting the same feature agent in multiple generations of the forwarding ASIC complicates the code of the feature agent, repeating the same feature logic for each version of the chip in the system is inefficient, and adding or removing support for a new chip is not straightforward, as the conditional logic may be convoluted (e.g., based on chip types/families) and may have to support programming different hardware resources in new chips. This frequently leads to breakages for existing chips.

In existing network devices, feature agents have evolved to the point that some of them serve as table managers. These feature agents manage hardware tables in the network device that are used, for example to maintain routes for forwarding packets that are processed by the ASIC of the network device, defining some kind of security policy, or other functions of the network device. If it is necessary to write data into a particular hardware table, a notification or message is sent to a feature agent associated with the table, and the feature agent writes the data into the table. Embodiments described herein concern these feature agents that are tasked with writing data into the hardware tables.

Commonly, the types of tasks performed by these feature agents involve writing multiple hardware tables in the chip, rather than only a single table. In some cases, some of the hardware tables are managed by one feature agent (i.e., the tables are written to by only that feature agent), while other hardware tables to which writes need to be made are owned by some other feature agents. In other cases, certain hardware resources may be applicable or usable across multiple features. For example, a MAC address can point to the forward equivalency class (FEC) table (e.g., in L2 forwarding to a VXLAN tunnel), or an access control list (ACL) entry can point to the FEC table for policy-based routing (PBR). Cross-agent coordination is therefore required in order to be able to request allocation of resources from one agent to another.

Even when a table is owned by a single feature agent, there is typically an ordering requirement to ensure that the entries are correctly programmed in the tables. In many cases, the hardware resources in a chip that are used by a feature are dependent on each other, so there may be an implicit programming order dependency between hardware tables. For example, a FEC table must be programmed before the equal cost multipath (ECMP) group that refers to the FEC table is programmed, and entries in a logic prefix match (LPM) table are programmed after the ECMP table and/or FEC table is programmed. In another example, when routing to a tunnel, an encapsulation table entry needs to be programmed before the route pointing to that tunnel is programmed.

If the entries are not programmed in order, the packets processed by the forwarding chip may not be properly routed by the network device. Thus, for example, it may be necessary to program an entry in a first hardware table, then a second hardware table, then a third hardware table, and so on. The network device therefore has to ensure that the first hardware table is programmed before the next entry is programmed in the second table, and so on. If the ordering of the writes to the hardware tables is not maintained, the corresponding networking feature may not work properly on that chip.

The existing feature agent model and the chip management model do not lead to semantics for naturally ordered writes, updates and deletes in hardware tables. Consequently, it is necessary in existing systems to make a write (or update or delete) and then wait for an acknowledgement before another write (or update or delete) can be made. This is illustrated in FIGS. 2 and 3.

Figure 2:
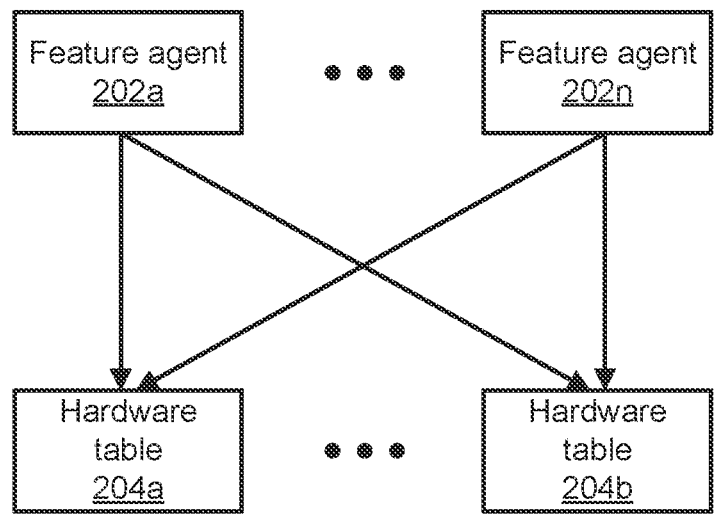
FIG. 2 is a diagram illustrating the relationship of feature agents to the hardware tables in a network device in an existing network device.

Referring to FIG. 2, a diagram illustrating the relationship of feature agents to the hardware tables in a conventional network device is shown. As depicted in this figure, the network device has a set of feature agents 202 which are executing on the operating system of the network device. The network device also includes a set of hardware tables 204 into which data may be written by feature agents 202. Each feature agent 202 may write to one or more of hardware tables 204. Feature agents 202 effectively write directly to the hardware tables.

In order for one of feature agents 202 to maintain write ordering in this system, it is necessary for the feature agent to make a particular write to one of the hardware tables and wait for acknowledgement of the write before proceeding to the next write. This process is illustrated in FIG. 3.

Figure 3:
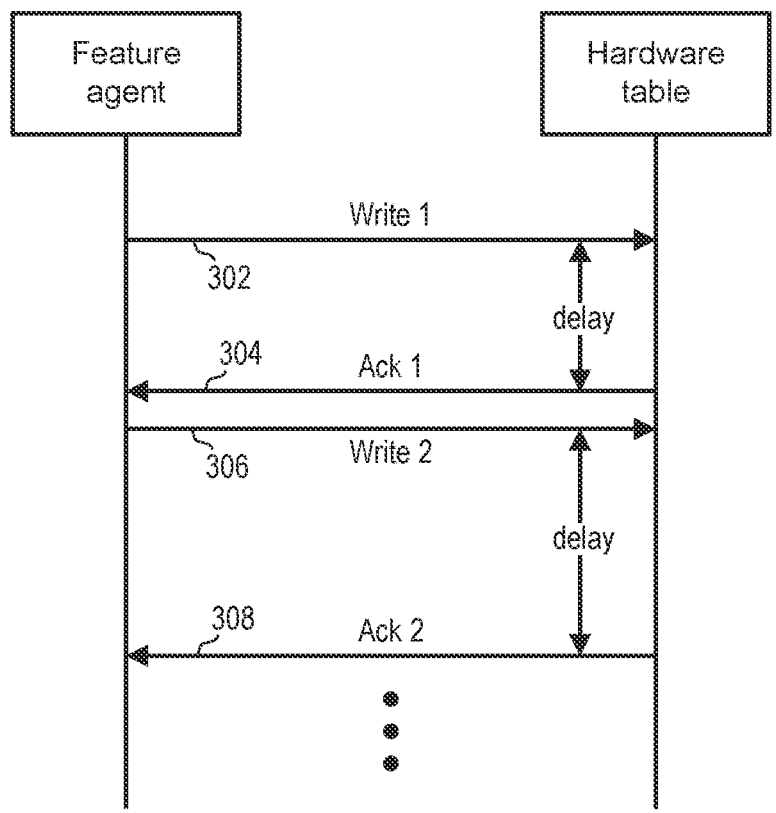
FIG. 3 is a transaction chart illustrating a set of ordered writes made by a feature agent to a hardware table in an existing network device.

FIG. 3 is a transaction chart illustrating a set of ordered writes made by a feature agent to a hardware table in an existing network device. The feature agent has a number (n) of writes that need to be made to the hardware table.

As depicted in the figure, the feature agent makes a first write (write 1) to the hardware table (302). After the feature agent makes the first write, it waits for an acknowledgement (ack 1) of the write (304). Until the acknowledgement is received, the feature agent will not make any subsequent writes in the ordered set because the first write may not have completed successfully, and making a subsequent write could result in mis-ordering of the writes.

After receiving acknowledgement 304, the feature agent can proceed with the next write, so it makes the next write (write 2) to the hardware table (306). Once the second write is made, the feature agent must again wait for a corresponding acknowledgement (308) from the hardware table before it can proceed. After the acknowledgement of the second write (ack 2) is received by the feature agent, it can proceed with the next ordered write. This process of writing and waiting for acknowledgement is repeated for each one of the ordered writes.

It should be noted that, although this example involves the feature agent writing to a single table, the feature agent may make the ordered writes to multiple hardware tables. The same process of writing and waiting for acknowledgement is still used, with the feature agent waiting for acknowledgement from the particular hardware table to which the corresponding write is made.

It is apparent that the time spent by the feature agent waiting for each acknowledgement is wasted, in the sense that the feature agent cannot make another write while it is waiting for an acknowledgement. The delays resulting from waiting for the acknowledgements can be substantial. Because of the unused waiting time, this process is very inefficient, particularly in a high network bandwidth environment where high throughput (e.g., gigabytes per second) is desired.

Embodiments disclosed herein minimize this acknowledgement delay time while still preserving the order in which writes are programmed in the hardware tables. This is accomplished by providing one or more software tables and a versioned log which is used to identify an order of the writes in the software tables. After the feature agent writes entries to the software tables, a hardware agent uses the entries in the versioned log to identify a next write to be transferred from the software table to a corresponding hardware table. Thus, the feature agent does not have to wait for an acknowledgement of each write and is not subject to the corresponding delays which are experienced in existing systems.

Figure 4:
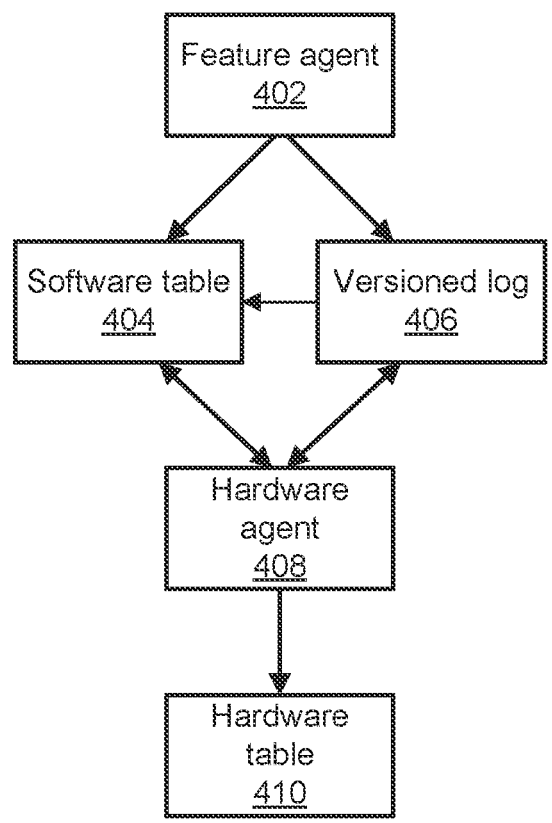
FIG. 4 is a diagram illustrating the structure of an example system in accordance with some embodiments.

Referring to FIG. 4, a diagram illustrating the structure of an example system in accordance with one embodiment is shown. In this embodiment, feature agent 402 is coupled to a software table 404 and a versioned log 406. A hardware agent 408 is also coupled to both software table 404 and versioned log 406. Hardware agent 408 is further coupled to hardware table 410.

As in existing systems, the end result of this system is to program hardware table 410 according to the writes issued by feature agent 402. Feature agent 402, however, does not write directly to hardware table 410 as in a conventional network device. Instead, feature agent 402 makes writes to software table 404. Because the writes may need to be ordered, feature agent 402 also makes entries in versioned log 406 for each of these ordered writes.

It should be noted that "versioned log" is used here to refer to any log, table or other record that may be used to record the order of the writes made by the feature agent. The log may include, for example, entries where each entry includes an indicator of the write that was made to the software table and an indicator of the order in which the write was made. The indicator of the write to the software table may be, for example, an address of the write in the table, a pointer to a location in the software table or any suitable indicator to allow the information written to the software table to be located and retrieved. The indicator of the order may be an index into the versioned log, a timestamp, or any other suitable indicator of the write order.

Figure 5:
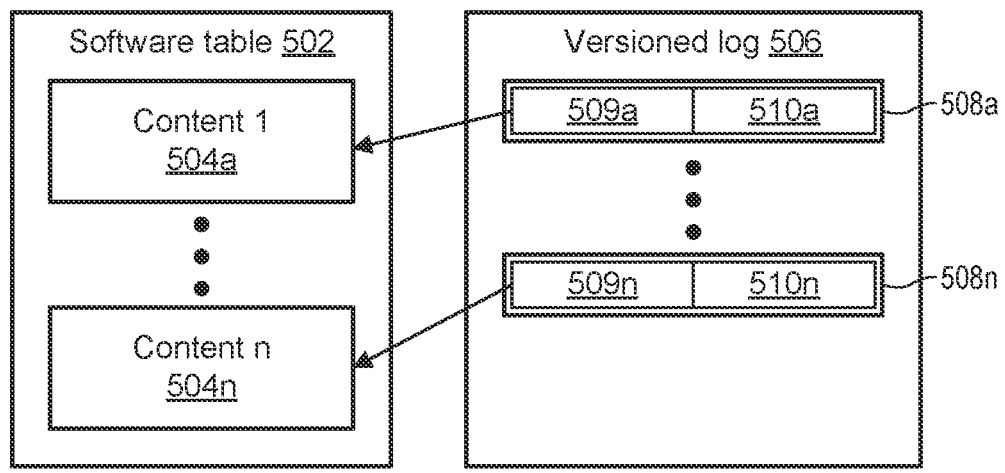
FIG. 5 is a diagram illustrating the relationship between the entries in the software table and entries in the versioned log in accordance with some embodiments.

Referring to FIG. 5, a diagram illustrating the relationship between the entries in the software table and entries in the versioned log is shown. In this example, software table 502 is accessible by the feature agent to write information into the table. Similarly, the feature agent can write entries into versioned log 506. When the feature agent writes entry 504a into the software table, it writes a corresponding entry 508a into versioned log 506. Versioned log entry 508a includes an indicator 509a of the location of software table entry 504a, and also includes an indicator 510a of the order in which software table entry 504a was written by the feature agent. Each time the feature agent writes an entry 504 to software table 502, it writes a corresponding entry 508 to versioned log 506.

It should be noted that although FIG. 5 includes only a single software table, a feature agent may write to multiple software tables. The versioned log may therefore include entries that reference writes that are made by the feature agent to multiple, different software tables. In such embodiments, the entries in the versioned log may also include an indicator of the specific software table into which the corresponding write was made. This indication of the specific software table may be separate from location indicator 509, or it may be incorporated into this location indicator.

Referring again to FIG. 4, hardware agent 408 is coupled to software table 404 so that the hardware agent can retrieve the data written to the software table by feature agent 402 and write this data to corresponding hardware table 410. Hardware agent 408 is configured to access versioned log 406 in order to determine which of the writes to the software table should be retrieved and written to hardware table 410.

More specifically, hardware agent 408 examines the entries in versioned log 406 to determine which of the entries is indicated as the next write that should be performed, according to the ordering information (e.g., 510) written to the log by feature agent 402. When hardware agent 408 determines which of the entries in versioned log 406 corresponds to the next entry that needs to be written, the hardware agent reads the location indicator of the versioned log entry to determine the location of the corresponding entry in software table 404. Hardware agent 408 then retrieves the entry from this location in software table 404 and writes a corresponding entry into corresponding hardware table 410.

Because the order of the writes made by the feature agent to the software table is maintained by the versioned log, it is not necessary for the feature agent to wait for acknowledgement of each write before proceeding to the next write in order to preserve the order of the write. The feature agent therefore does not experience the delays in existing systems that are caused by the requirement to wait for the individual acknowledgements of the writes. Accordingly, the efficiency of the feature agent's writes is increased.

It should be noted that the hardware table may store information in a different way than the software table. For instance, the feature agent may store information in the software table in a first format, while the hardware table stores information in a different format. In existing systems, since the feature agent writes the information into the hardware table, the feature agent is responsible for converting or translating the information from its own native format to the hardware table's format. It may also be necessary for the feature agent to translate the data in some other manner.

In the systems disclosed herein, however, the feature agent simply writes the information to the software table in a format which is native to the feature agent, so no translation of the information by the feature agent is required. When the hardware agent retrieves the information from the software table, the hardware agent performs the reformatting or other translation of the content as needed to write the information into the hardware table. Since the feature agent does not have to perform any translation of the content to adapt it to the hardware table, the processing resources required by the feature agent are reduced. Additionally, since the feature agent does not have to perform this translation, it is less costly and time consuming to build (code) the feature agent.

Figure 6:
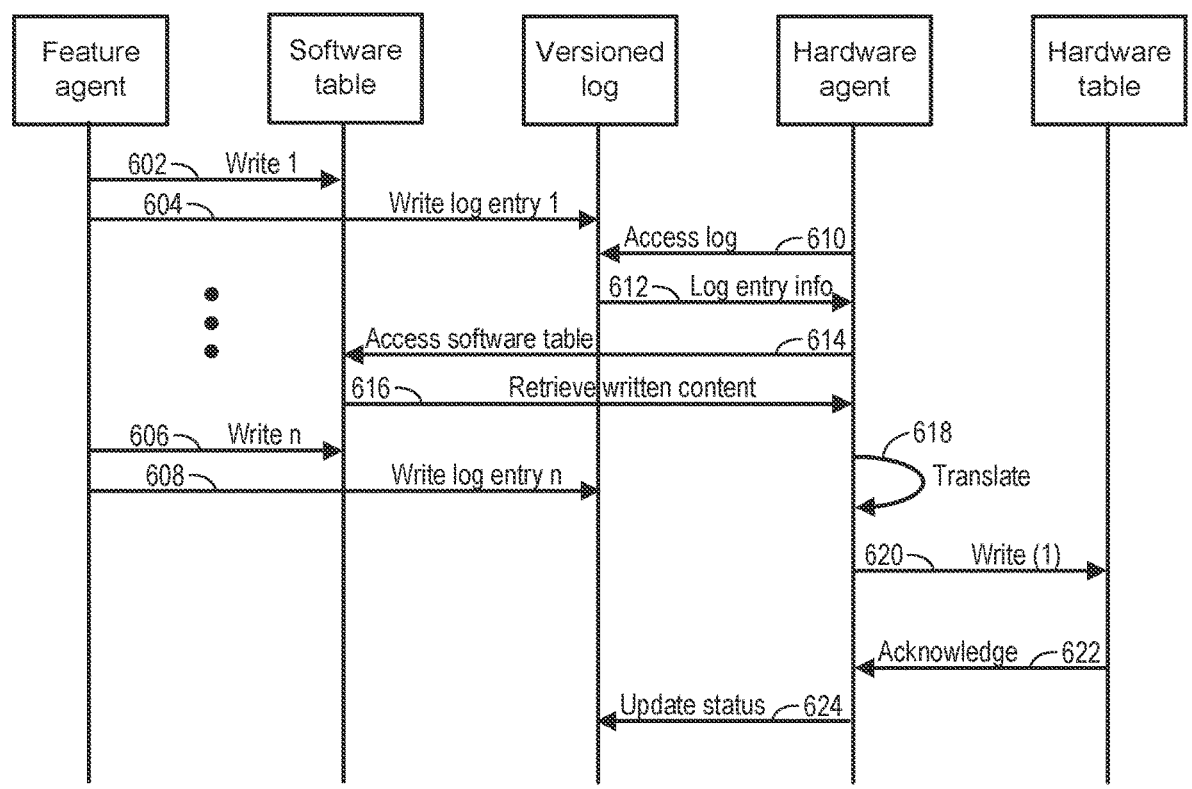
FIG. 6 is a transaction diagram illustrating the process of writing to the hardware table in accordance with some embodiments.

Referring to FIG. 6, a transaction diagram is shown to illustrate the process of writing to the hardware table. At 602, the feature agent makes a write to the software table and immediately thereafter writes an entry to the versioned log (at 604) which identifies the location of the write in the software table and the order of the software table write. The feature agent may also update a status associated with the entry to indicate that the corresponding entry in the software table needs to be transferred to the hardware table. The status may alternatively be associated with the versioned log or the software table to indicate more generally that the hardware agent needs to take some action with respect to the entry, log or table.

The feature agent then makes a second write to the software table (606) and a corresponding entry to the versioned log (608) with the location and order of the second write to the software table. The feature agent does not have to wait for any type of acknowledgement after the first software table entry and corresponding versioned log entry are made (602, 604) before proceeding to the second write to the software table and the corresponding versioned log entry (606, 608). The feature agent may continue to make any number of writes to the software table and corresponding entries in the versioned log without any intervening delays.

After the feature agent makes the first write to the software table and makes the corresponding entry to the versioned log (602, 604), the updated status of the entry, log or table is provided or made available to the hardware agent. This provides an indication to the hardware agent that the hardware agent needs to take action.

In response to this indication, the hardware agent examines the versioned log (610) to identify one of the entries as representing the next software table write that needs to be entered in the corresponding hardware table. The hardware agent retrieves (612) from the identified entry in the versioned log the location information in the entry which indicates the location of the corresponding write in the software table. The hardware agent then uses this location information to access the software table (614) and retrieves (616) the content stored at the indicated location.

If necessary, the hardware agent translates (618) the information retrieved from the software table into a form that is suitable for writing to the hardware table. After the retrieved information has been converted to a suitable form, it is written by the hardware agent to the hardware table (620). The hardware agent then waits for an acknowledgement (622) to be received from the hardware table, indicating that the write to the hardware table has been successfully completed.

The hardware agent then updates the status of the entry in the versioned log (624) to indicate that the corresponding write to the software table has been successfully transferred to the hardware table. In alternative embodiments, the entry could be deleted, invalidated or otherwise updated so that it no longer presents a task to be completed by the hardware agent.

After the hardware agent receives the acknowledgement of the successful write, it can repeat the process of transactions 610-624. Thus, the hardware agent examines the versioned log to identify the log entry corresponding to the next write that needs to be transferred from the software table to the hardware table. As noted above, the log entry for the previous write has been updated, invalidated or deleted to show that the write has been completed, so the entry is no longer considered. When the next entry among the ordered writes made by the feature agent is identified, the hardware agent retrieves the location information for the write, accesses the software table and retrieves the corresponding content, translates or transforms the content as needed, writes the content to the hardware table in the appropriate form, waits for an acknowledgement, and then updates the status of the entry in the versioned log.

It should be noted that the transactions of the feature agent proceed without regard to the transactions of the hardware agent. The feature agent simply writes to the software table and versioned log without having to wait for the hardware agent to take any action. Similarly, the transactions of the hardware agent proceed without regard to the transactions of the feature agent, except that the hardware agent cannot act on entries in the versioned log (and corresponding information written by the feature agent to the software table) until the feature agent writes these entries into the log.

Since the transactions of the feature agent are not dependent on the transactions of the hardware agent, the feature agent's transactions for an ordered set of writes can proceed without any delays. In other words, after the feature agent makes one write to the software table (and makes a corresponding entry in the versioned log), it then immediately proceeds to the next write in the set of ordered writes. The delays that are experienced in existing systems as a result of waiting for hardware table acknowledgements are eliminated.

Another benefit of this system is that the feature agent is abstracted from the hardware table writes. Since the feature agent makes writes to the software table, it does not have to be concerned with any data transformation or reformatting that might be necessary to write to the hardware table.

Figure 7:
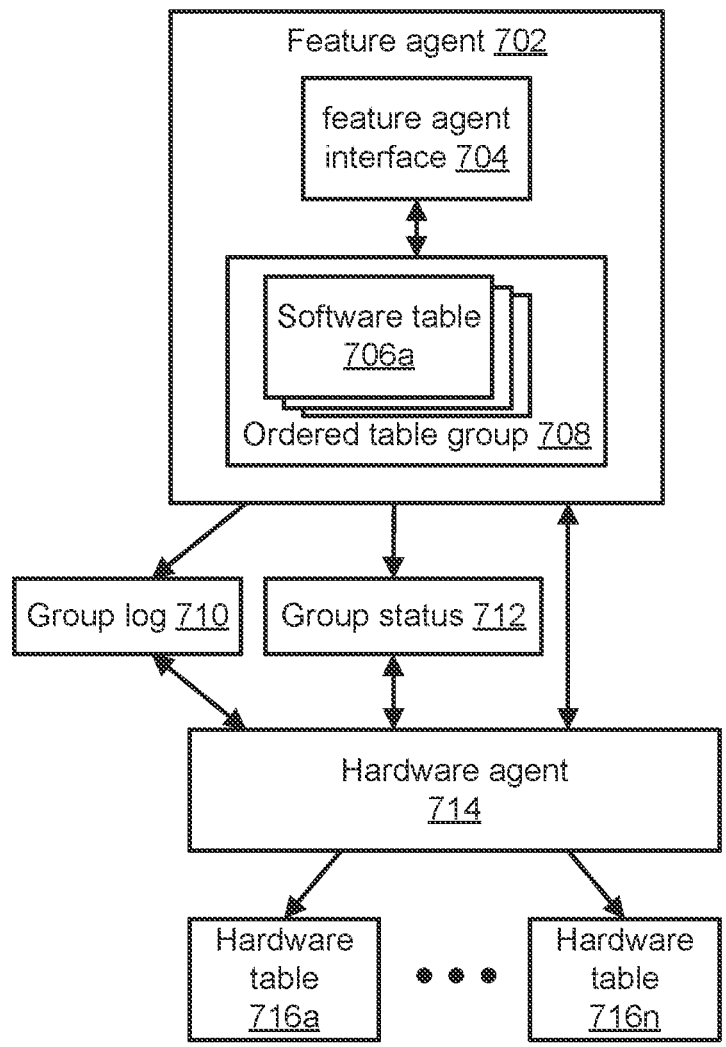
FIG. 7 is a system as may be implemented in a network device in accordance with some embodiments.

There may be various alternative embodiments of the systems disclosed herein. An example of such a system as may be implemented in a network device is shown in FIG. 7. In this system, a feature agent 702 of the network device includes a feature agent interface 704 as well as a set of one or more software tables 706. The set of software tables forms an ordered table group, where the order of writes is maintained for all of the software tables in the ordered table group. In other words, if a first write is made to a first one of the software tables and then a second write is made to a second one of the software tables, the system will maintain this ordering so that the first write is made to a first hardware table corresponding to the first software table, and then the second write is made to a second hardware table corresponding to the second software table.

Ordered table group 708 is coupled to a group log 710 and a group status 712 which are stored in the memory of the network device. A hardware agent 714 of the network device is also coupled to group log 710 and group status 712, as well as ordered table group 708. Hardware agent 714 is further coupled to a set of hardware tables 716 to which content from software tables 706 are to be written.

The system of FIG. 7 operates in a substantially similar manner as the embodiments described above. For instance, feature agent interface 704 makes multiple writes to software tables 706 in ordered table group 708, makes corresponding entries in group log 710 indicating the order of the writes to tables 706, and updates group status 712 to indicate that the content written to software tables 706 need to be written to hardware tables 716.

One of the significant differences from the embodiments described above is that there are multiple software tables 706. For any writes that are made to tables within ordered table group 708, feature agent interface 704 makes corresponding entries in the single group log 710 that is associated with ordered table group 708. It should be noted that there may be multiple ordered table groups within the feature agent, and each group is associated with a single corresponding group log. Thus, writes to software tables within a given ordered table group will remain ordered, but the ordering of writes to software tables within one ordered table group will not necessarily be maintained with respect to writes to software tables within a different ordered table group.

After feature agent interface 704 has made one or more writes to software tables 706, made corresponding entries in group log 710 and updated group status 712, hardware agent 714 begins processing the write(s) in the software tables. In response to determining (from group status 712) that there are unprocessed writes in the software tables, hardware agent 714 examines group log 710 to identify the next one of the ordered entries that needs to be processed. Hardware agent 714 identifies from this entry which software table 706 in ordered table group 708 contains the corresponding content, as well as the location of the content within the table.

Hardware agent 714 then accesses the identified table and retrieves the content from the identified location and performs any translation of the content that is necessary to place it in the appropriate form for the corresponding hardware table 716 to which it is to be written. Hardware agent 714 then writes the content to the hardware table. After the hardware agent writes the content to the hardware table, it receives acknowledgement of the successful write from the hardware table and then updates group status 712 to show that the content corresponding to the log entry has been successfully written to the appropriate hardware table(s). In some embodiments, the hardware agent may perform multiple writes to the hardware tables (corresponding to multiple entries in the group log) before updating group status 712.

Figure 8:
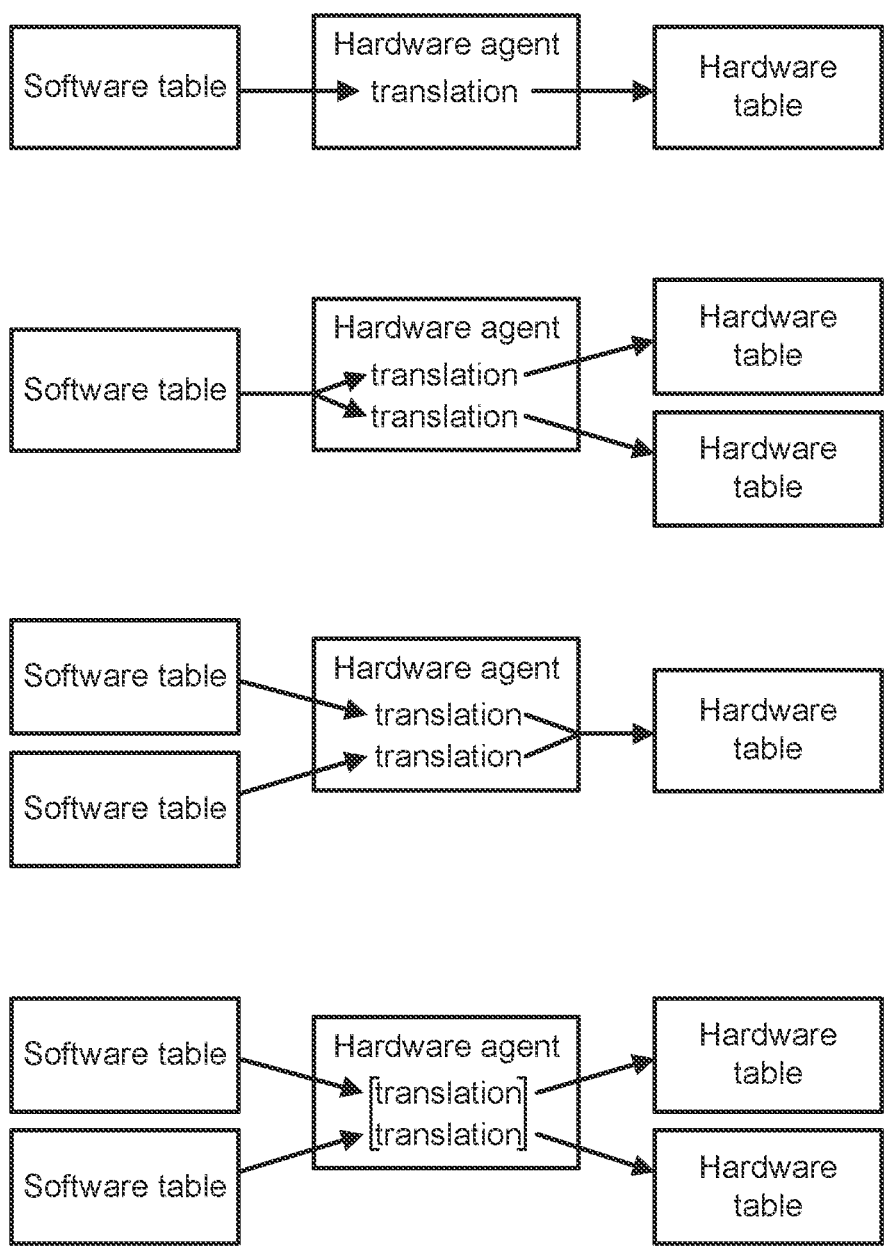
FIG. 8 is a diagram illustrating several examples of the correspondence of software tables to hardware tables in accordance with some embodiments.

As noted above, there may be multiple software tables 706 into which feature agent interface 704 write content and there may be multiple hardware tables 716 into which this content may be transferred. It should also be noted that there is not necessarily a one-to-one correspondence between the software tables to which content is initially written and the hardware tables to which the content is finally transferred. Referring to FIG. 8, a diagram is provided to illustrate several possibilities for the correspondence of software tables to hardware tables.

At the top of the figure, a simple one-to-one correspondence between a software table and a hardware table is shown. In this case, the feature agent writes content to a single software table, then the hardware agent makes any necessary translation of the content and writes the content into a single hardware table.

In the next example in the figure, a one-to-many correspondence between the tables is shown. In this example, the feature agent again writes content into a single software table, but the content is destined for two different hardware tables. The hardware agent therefore makes appropriate translations of the content for the two different hardware tables and writes the content into the different hardware tables. Although only two hardware tables are shown in this example, the content may be written into more than two hardware tables in other instances.

In the third example of the figure, a many-to-one correspondence between the tables is shown. In this example, the feature agent initially writes content into multiple software tables, but all of the content is destined for a single hardware table. The hardware agent makes any appropriate translation of the content in each of the software tables and then writes the translated content into the single hardware table. Although only two software tables are depicted, there may be additional software tables from which content is translated and written into the hardware table.

In the fourth example of the figure, a many-to-many correspondence between the tables is shown. In this example, the feature agent initially writes content into multiple software tables, and the content is destined for multiple hardware tables. The hardware agent therefore makes appropriate translations of the content for the different hardware tables and writes the content into the different hardware tables. It should be noted that parts of each software table may be translated and written to each of the different hardware tables. Although only two software tables and two hardware tables are shown in this example, there may be more than two software or hardware tables in other instances.

There may be many alternative embodiments of the present systems and methods. For instance, another example embodiment comprises a method for maintaining order consistency for asynchronous writes in a network device, where the method includes issuing, by a feature agent of a network device, a plurality of writes to one or more software tables, which may be contained in the feature agent. For each of the writes, a corresponding log entry is added to a log associated with the software tables, where the log entry is versioned to identify an order of the write among the plurality of writes. The method further includes a hardware agent of the network device accessing the log to select the next one of the log entries in the identified order (e.g., by selecting the entry with the earliest version) and accessing the software table to retrieve content from the software table corresponding to the selected log entry. The hardware agent then writes the information retrieved from the software table to one or more hardware tables that are indicated by the write associated with the selected log entry. The hardware agent may translate the information from the software table to a different form if necessary before writing the information to the hardware table. The feature agent and the hardware agent may operate independently of each other.

The steps of accessing the log, accessing the software table and writing the information may be repeated for successive ones of the log entries corresponding to the writes. The method may further include the hardware agent acknowledging writes to the hardware tables corresponding to the writes to the software tables. Acknowledging the writes to the hardware tables may comprise providing a cumulative acknowledgement to the feature agent for multiple writes. Acknowledging the writes to the hardware tables may further comprise updating a group status associated with an ordered table group which is associated with the log.

In this method, the software tables may be contained in an ordered table group associated with the log, where information corresponding to the writes to the software tables is written to the corresponding hardware tables in the order in which the corresponding log entries were written to the log. Additionally, there may be one or more additional software tables that are contained in a second ordered table group associated with a second log, and when additional writes are made by the feature agent to the additional tables, a corresponding log entry is added for each of the additional writes to the second log. Each log entry may be versioned to identify the order of the corresponding write among the set of writes. Each log entry may also include an identifier of a corresponding one of the software tables or a location of the corresponding write in the software tables.

In another example embodiment, a network device having one or more processors coupled to one or more memories includes a feature agent and a hardware agent. The feature agent is configured to issue a set of writes to one or more software tables and, for each of the writes, add a corresponding log entry to a log associated with the software tables, where the log entry is versioned to identify the order of the set of writes. The hardware agent is configured to access the log to select a next one of the log entries, access the software table to retrieve information from the software table corresponding to the selected log entry, and write the information retrieved from the software table to one or more hardware tables indicated by the write which corresponds to the selected entry. The hardware agent is configured to repeat the accessing the log, the accessing the software table and the writing the retrieved information to the corresponding hardware is repeated for each of the writes to the software tables. The network device may then route network packets according to the information written to the hardware tables. In some embodiments, the hardware agent is configured to, if necessary, translate content of each write from a first form in the corresponding software table to a different form in which the content is stored in the corresponding hardware table. The hardware agent may be configured to update a status associated with the log to indicate successful completion of the writes to the hardware tables. The status update may be made in response to receiving acknowledgement of the writes to the hardware tables.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of this disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments disclosed herein will be employed without a corresponding use of other features, and features described with respect to one embodiment may be combined with features of other embodiments without departing from the scope and spirit of the disclosure as set forth.

What is claimed is:

1. A method for maintaining order consistency for asynchronous writes in a network device, the method comprising:
   issuing, by a feature agent of a network device, a plurality of writes to one or more software tables;
   for each of the plurality of writes, adding a corresponding log entry to a log associated with the one or more software tables, wherein the corresponding log entry is versioned to identify an order of the write among the plurality of writes;
   accessing, by a hardware agent of the network device, the log to select a next one of the corresponding log entries;
   accessing, by the hardware agent, the software table to retrieve information from the software table corresponding to the selected one of the corresponding log entries; and
   writing, by the hardware agent, the information retrieved from the software table to one or more hardware tables indicated by the write corresponding to the selected one of the corresponding log entries.

2. The method of claim 1,
   wherein the one or more software tables are contained in an ordered table group associated with the log, and
   wherein information corresponding to the plurality of writes to the one or more software tables in the ordered table group is written to the corresponding one or more hardware tables in the order in which the corresponding log entries were written to the log.

3. The method of claim 1,
   wherein the one or more software tables are contained in a first ordered table group associated with the log,
   wherein one or more additional software tables are contained in a second ordered table group associated with a second log, and
   wherein when one or more additional writes are issued by the feature agent to the one or more additional software tables, for each of the one or more additional writes, a corresponding log entry is added to the second log associated with the one or more additional software tables in the second ordered table group.

4. The method of claim 3, wherein each corresponding log entry in the second log is versioned to identify an order of the write among the one or more writes to the one or more additional software tables.

5. The method of claim 1, further comprising repeating the steps of accessing the log, accessing the software table and writing the information for successive ones of the corresponding log entries corresponding to the plurality of writes.

6. The method of claim 5, further comprising acknowledging, by the hardware agent, writes to the one or more hardware tables corresponding to the plurality of writes to the one or more software tables.

7. The method of claim 6, wherein acknowledging the writes to the one or more hardware tables comprises providing a cumulative acknowledgement to the feature agent.

8. The method of claim 6, wherein acknowledging the writes to the one or more hardware tables comprises updating a group status associated with an ordered table group which is associated with the log.

9. The method of claim 1, wherein the feature agent operates independently of the hardware agent.

10. The method of claim 1, wherein the next one of the corresponding log entries is selected based on the version of each corresponding log entry.

11. The method of claim 1, further comprising prior to writing the information to the one or more hardware tables, translating the information corresponding to each of the one or more hardware tables to a form required by the hardware table.

12. The method of claim 1, wherein the one or more software tables are contained in the feature agent.

13. The method of claim 1, wherein each corresponding log entry includes an identifier of a location of the corresponding write in the one or more software tables.

14. The method of claim 13, wherein each corresponding log entry includes an identifier of a corresponding one of the one or more software tables.

15. A network device comprising:
one or more processors coupled to one or more memories;
a feature agent configured to
issue a plurality of writes to one or more software tables, and
for each of the plurality of writes, add a corresponding log entry to a log associated with the one or more software tables, wherein the corresponding log entry is versioned to identify an order of the write among the plurality of writes;
a hardware agent configured to
access the log to select a next one of the corresponding log entries,
access the software table to retrieve information from the software table corresponding to the selected one of the corresponding log entries, and
write the information retrieved from the software table to one or more hardware tables indicated by the write corresponding to the selected one of the corresponding log entries.

16. The network device of claim 15, wherein the hardware agent is configured to repeat the accessing the log, the accessing the software table and the writing the retrieved information to one or more corresponding hardware is repeated for each of the plurality of writes to the one or more software tables.

17. The network device of claim 16, wherein the network device is configured to process network packets according to the information written to the one or more hardware tables.

18. The network device of claim 16, wherein the hardware agent is configured to, for one or more of the writes to the one or more software tables, translate content of the write from a first form in the corresponding software table to a second form in which the content is stored in the corresponding hardware table, wherein the second form is different from the first form.

19. The network device of claim 15, wherein the hardware agent is configured to update a status associated with the log to indicate successful completion of one or more of the writes to the one or more hardware tables.

20. The network device of claim 19, wherein the hardware agent is configured to update the status associated with the log in response to receiving one or more acknowledgement of the one or more writes to the one or more hardware tables.

* * * * *